(12) United States Patent
Cornelissen et al.

(10) Patent No.: US 10,974,291 B2
(45) Date of Patent: Apr. 13, 2021

(54) HIGH PRESSURE SEPARATOR CLEANING METHODS AND APPARATUS

(71) Applicant: ExxonMobil Chemical Patents Inc., Baytown, TX (US)

(72) Inventors: Philip H. Cornelissen, Heverlee (BE); Dirk H. Brouns, Antwerp (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 201 days.

(21) Appl. No.: 16/319,419

(22) PCT Filed: Jun. 6, 2017

(86) PCT No.: PCT/US2017/036081
§ 371 (c)(1),
(2) Date: Jan. 21, 2019

(87) PCT Pub. No.: WO2018/022195
PCT Pub. Date: Feb. 1, 2018

(65) Prior Publication Data
US 2020/0179996 A1    Jun. 11, 2020

Related U.S. Application Data

(60) Provisional application No. 62/367,949, filed on Jul. 28, 2016.

(51) Int. Cl.
*B08B 9/08* (2006.01)
*B01D 1/30* (2006.01)
*B01J 19/00* (2006.01)
*B01J 19/06* (2006.01)
*B05B 13/04* (2006.01)
(Continued)

(52) U.S. Cl.
CPC .............. *B08B 9/0813* (2013.01); *B01D 1/30* (2013.01); *B01J 19/002* (2013.01);
(Continued)

(58) Field of Classification Search
CPC . B08B 9/0813; B08B 2209/08; B05B 13/041; B05B 13/0636; B05B 13/069;
(Continued)

(56) References Cited

U.S. PATENT DOCUMENTS 3,595,256 A * 7/1971 Waltman ............... B08B 9/0936
                                                     134/167 R
3,599,871 A * 8/1971 Ruppel ................. B08B 9/0936
                                                     239/227

(Continued)

FOREIGN PATENT DOCUMENTS

AU          441515 B    10/1973
DE     202006016078 U    1/2007
WO       2012/080876 A    6/2012

*Primary Examiner* — Sharidan Carrillo
(74) *Attorney, Agent, or Firm* — ExxonMobil Chemical Patents Inc.—Law Department (57) ABSTRACT

A process and system for cleaning a high pressure separator vessel in a polymerization reactor without removing the top cover and its associated bolts by providing a cleaning hole in a fluid fitting above and adjacent to the top cover, through which a cord or cable is fed and affixed to a rotatable cleaning nozzle. The cleaning nozzle is gradually raised, lowered and rotated to direct a high pressure liquid onto the interior walls of the vessel to remove accumulated waste material.

9 Claims, 5 Drawing Sheets

(51) Int. Cl.
*B05B 13/06* (2006.01)
*B01J 19/24* (2006.01)
*B05B 15/555* (2018.01)
*B05B 15/60* (2018.01)

(52) U.S. Cl.
CPC .......... *B01J 19/0053* (2013.01); *B01J 19/06* (2013.01); *B01J 19/24* (2013.01); *B05B 13/041* (2013.01); *B05B 13/069* (2013.01); *B05B 13/0636* (2013.01); *B05B 15/555* (2018.02); *B05B 15/60* (2018.02); *B01J 2219/00247* (2013.01); *B08B 2209/08* (2013.01)

(58) Field of Classification Search
CPC . B01D 1/30; B01J 19/002; B01J 19/06; B01J 2219/00247
See application file for complete search history.

(56) References Cited

U.S. PATENT DOCUMENTS

| | | | | |
|---|---|---|---|---|
| 3,645,452 | A * | 2/1972 | Stoeckel | B08B 9/0936 239/227 |
| 3,741,808 | A * | 6/1973 | Stalker | B08B 9/0936 134/58 R |
| 5,776,257 | A * | 7/1998 | Arnold | B08B 9/0933 134/11 |
| 2010/0069701 | A1* | 3/2010 | Turok | F26B 21/003 588/313 |
| 2013/0001891 | A1 | 1/2013 | Tower | |
| 2013/0319564 | A1 | 12/2013 | Torres et al. | |
| 2016/0228931 | A1* | 8/2016 | Burkhard | B05B 13/0278 |

\* cited by examiner

HIGH PRESSURE SEPARATOR CLEANING METHODS AND APPARATUS

CROSS-REFERENCE OF RELATED APPLICATIONS

This application is a National Phase Application claiming priority to PCT Application Serial No. PCT/US2017/036081 filed Jun. 6, 2017, which claims priority to U.S. Provisional Application No. 62/367,949 filed Jul. 28, 2016, which are incorporated herein by references.

FIELD OF THE INVENTION

The invention relates to a process of and apparatus for cleaning a high pressure separator (HPS) in a polymerization reactor without the need to remove the top cover of the HPS.

BACKGROUND OF THE INVENTION

In a slurry polymerization process, it is common to separate polymer from diluent in a pressure vessel by flashing off the diluent overhead and recovering the polymer via gravity. Most of the separation vessels operate fairly well when there is a sufficient pressure differential available across such vessels. However, when the available pressure differential is reduced such as in the case of using multi-stage separation to reduce energy consumption, polymer can potentially accumulate in the vessel and eventually plug and foul equipment, causing operability problems that interrupt the operation of the reactor.

The polymer that accumulates can be so called "amorphous" polymer, or simply polymer that has formed agglomerates such that large chunks of the polymer can no longer cycle through the reactor system and plugs one or more operating lines or openings. Also, polymer may adhere to the inside surface of the reactor system and accumulate to such a degree that the system is fouled.

Accordingly, the high pressure separator vessel of a polymerization reactor requires cleaning from time to time, due to build-up of waste or excess polymerization product on the interior walls of the HPS. This build-up occurs when high pressure gases are released from the overhead space in the HPS and previously solubilized polymer begins to condense within the separator.

Chemical-based methods for reducing fouling in vessels used in polymerization reactor systems are known, such as by contacting a polyolefin reaction mixture with an organic amine prior to its entering a high pressure separator.

Additionally, physical cleaning systems for low pressure vessels in polymerization reactor systems are known, such as where a polytetrafluoroethylene lining covers the interior surfaces of a vessel having a cover mounting assembly with an annular clamp for detachably mounting the cover over the vessel. When cleaning is required, the vessel is drained of liquid polymer and allowed to cool to ambient temperature, thus, creating a frozen "skin" of the polymer around the interior surfaces of the vessel, which is peeled off the interior sides of the vessel after releasing the cover.

However, high pressure separator vessels require quite heavy top covers, which must be bolted onto the HPS with a series of large, heavy bolts. Opening the top cover is time consuming, as the big top cover bolts need to be loosened and re-tightened with special hydraulic tensioning equipment.

It would be advantageous if a simple and relatively inexpensive process were available to clean the excess and/or waste polymer from the interior walls of a high pressure separator in a polymerization reactor system.

SUMMARY OF THE INVENTION

Provided are a process for cleaning a high pressure separator vessel in a polymerization reactor, without removing the top cover of the vessel, and a system for accomplishing the cleaning process.

In an embodiment, the process includes opening an outlet at a bottom of the high pressure separator vessel, removing a flush plug from a fluid fitting above and adjacent to a top cover of the high pressure separator vessel, thus exposing a cleaning hole in the fluid fitting, feeding a cord or cable through the cleaning hole into an interior of the high pressure separator vessel and down to the outlet, affixing a rotatable cleaning nozzle to the cord or cable at the outlet, supplying a pressurized liquid to the cleaning nozzle, and gradually raising and/or lowering and rotating the cleaning nozzle through the inside of the high pressure separator vessel from the bottom to a top thereof, such that the pressurized liquid is directed into contact with an inner wall of the high pressure separator vessel and removes accumulated waste material.

In some embodiments, the process includes threading a cleaning hose connection nut having a central aperture into the cleaning hole to protect threads in the cleaning hole.

In some embodiments, the process includes gradually lowering and rotating the cleaning nozzle from the top to the bottom of the interior of the high pressure separator while the pressurized liquid is supplied to the cleaning nozzle and directed into contact with the inner wall of the high pressure separator vessel.

In some embodiments, the process includes not removing the top cover of the high pressure separator vessel.

In some embodiments, the process includes not removing the fluid fitting above and adjacent the top cover of the high pressure separator vessel.

In some embodiments, the process includes wherein the fluid fitting above and adjacent to the top cover is a spool piece or a top flange.

In some embodiments, the process includes wherein the flush plug comprises a shaft structured and arranged to extend through the cleaning hole, a frusto-conical plug at one end of the shaft, structured and arranged to fit within and seal the cleaning hole, and a threaded gland nut structured and arranged to thread into the cleaning hole to provide axial sealing pressure to the frusto-conical plug.

In some embodiments, the process further includes supplying pressurized liquid through a second cleaning nozzle directed at the outlet at the bottom of the high pressure separator vessel to prevent the removed waste material from plugging the outlet.

In some embodiments, the process includes wherein the accumulated waste material is polymer waste.

In some embodiments, the process includes wherein the cleaning hole is directed at an angle through the fluid fitting above the top cover.

In another form, the system for cleaning a high pressure separator includes a fluid fitting structured and arranged to attach to the top cover of a high pressure separator, the fluid fitting having disposed therein a cleaning hole extending from an outer wall to an interior void of the fluid fitting, and a removable flush plug structured and arranged to seal the cleaning hole.

In some embodiments, the system is such that the cleaning hole is disposed at an angle relative to the bottom of the fluid fitting.

In some embodiments, the fluid fitting is a spool piece or a top flange.

In some embodiments, the removable flush plug includes a shaft having a frusto-conical plug at one end and a threaded gland nut structured and arranged to thread into the cleaning hole to provide axial sealing pressure to the frusto-conical plug.

In some embodiments, the cleaning system further includes a cleaning hose connection nut having a threaded exterior structured and arranged to thread into the cleaning hole, and a central aperture for accommodating a cord or cable.

In some embodiments, the cleaning system further includes a rotatable high pressure cleaning nozzle having a pressurized liquid supply inlet and spray outlet.

DETAILED DESCRIPTION

The presently disclosed process for cleaning of a high pressure separator vessel in a polymerization process system is particularly advantageous, since the process can be conducted in much less time than that expended in a conventional cleaning method. As indicated above, the cleaning process may be conducted without removing the top cover of the HPS, instead by providing a sealable hole of a suitable size and structure in a fluid fitting, such as a flange or the like, which sits atop the HPS top cover. Advantageously, even this fluid fitting need not be removed to conduct the cleaning process.

The cleaning process includes opening an outlet at a bottom of the high pressure separator vessel, removing a flush plug from a fluid fitting above and adjacent to a top cover of the high pressure separator vessel, thus, exposing a cleaning hole in the fluid fitting, feeding a cord or cable through the cleaning hole into an interior of the high pressure separator vessel and down to the outlet, affixing a rotatable cleaning nozzle to the cord or cable at the outlet, supplying a pressurized liquid to the cleaning nozzle, and gradually raising and/or lowering and rotating the cleaning nozzle through the inside of the high pressure separator vessel from the bottom to a top thereof, such that the pressurized liquid is directed into contact with an inner wall of the high pressure separator vessel and removes accumulated waste material.

The process will be better understood by referring to the figures. In FIGS. 1 through 4D, like numerals denote like, or similar, structures and/or features; and each of the illustrated structures and/or features may not be discussed in detail herein with reference to each of FIGS. 1 through 4D. Similarly, each structure and/or feature may not be explicitly labeled in each of FIGS. 1 through 4D; and any structure and/or feature that is discussed herein with reference to any one of FIGS. 1 through 4D may be utilized with any other of FIGS. 1 through 4D without departing from the scope of the present disclosure.

Figure 1:
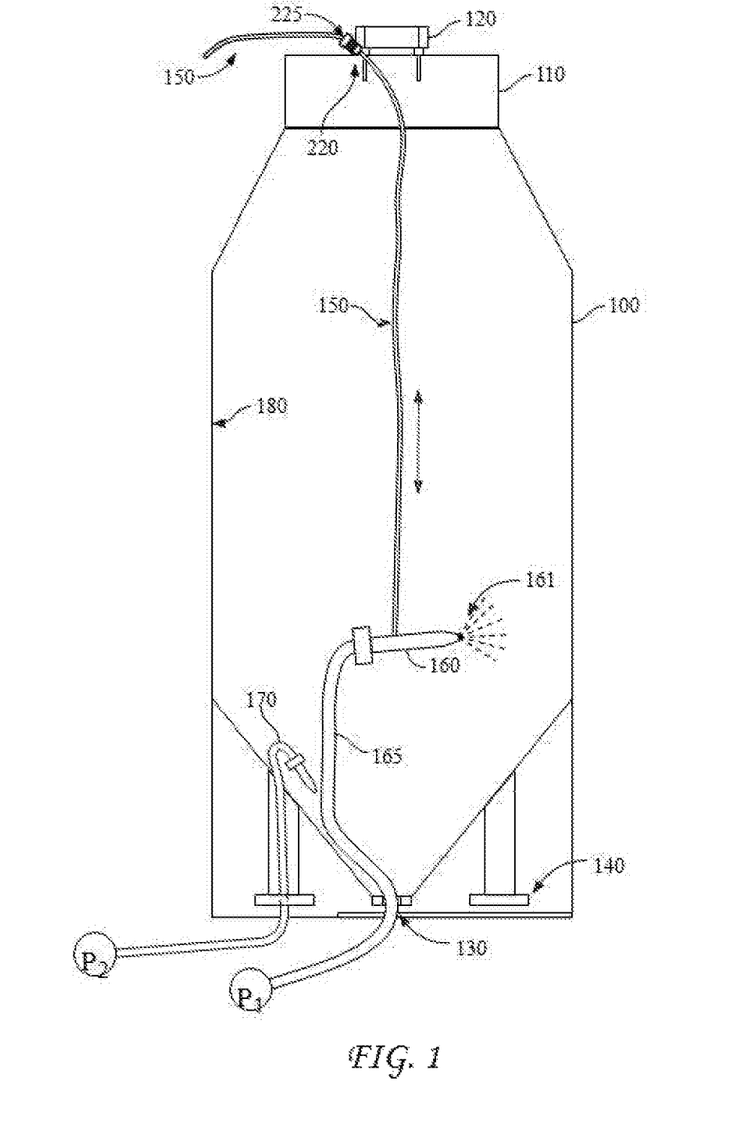
FIG. 1 is a schematic representation of a high pressure separator (HPS) and the cleaning apparatuses described below.

FIG. 1 provides an overall cutaway cross-sectional view of a high pressure separator vessel 100, which has one or more nozzles 140 on the lower portion for insertion of measuring instruments. The HPS has a heavy top cover 110 bolted (not shown) to a top portion thereof, as well as at least one fluid fitting 120 attached adjacent to and above the top cover 110. The bottom of the HPS has a bottom outlet 130, from which solidified polymer particles or dissolved polymer can be removed from the HPS during a polymerization process. For the cleaning process, once the conditions within the polymerization system permit, any associated cover or piping is removed from the bottom outlet 130, exposing the interior of the HPS vessel for cleaning. Cleaning is advantageously commenced while the inner wall 180 of the HPS is still somewhat warm to facilitate removal of the waste polymer. Cleaning hole 220, which is directed through fluid fitting 120 at an angle relative to the horizontal bottom of the fitting, is opened and a cleaning hose connection nut 225 is threaded into cleaning hole 220 to protect the threads 223 (FIG. 3B) therein. The cleaning hose connection nut 225 is shown in the enlarged view of FIG. 4D as having a threaded exterior and a central aperture 226.

Subsequently, a cord or cable 150 is passed through the central aperture 226 of cleaning hose connection nut 225, down through the interior of the HPS and to the bottom outlet 130, where the bottom end of the cord or cable is connected to a rotatable high pressure cleaning nozzle 160. Nozzle 160 has a supply hose 165 which is connected to a pump P1 to supply a pressurized cleaning liquid to the nozzle. The pressurized cleaning liquid supplied to the nozzle can be water or other suitable fluid.

Figure 2A:
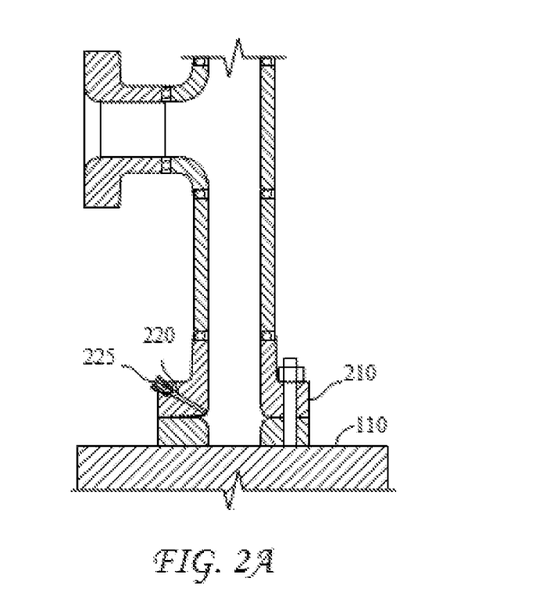
FIGS. 2A and 2B are examples of fittings located above and adjacent to the top plate of the HPS.
Figure 2B:
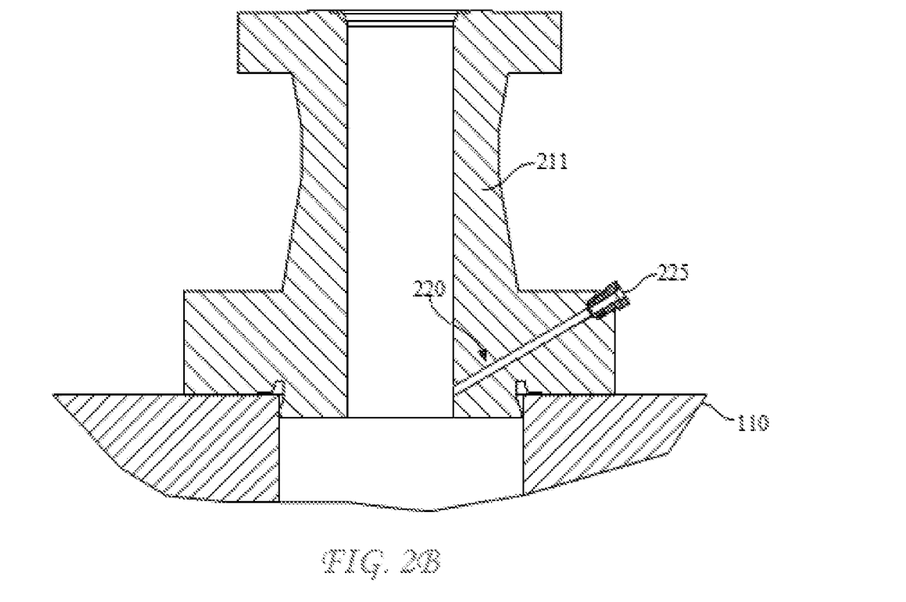

FIG. 2A is a cross-sectional representation of a top flange fluid fitting 210 bolted to top cover 110 of the HPS. Cleaning hole 220 is illustrated as being directed through flange fitting 210 at an angle relative to horizontal, extending into the interior void of the flange, and capped with cleaning hose connection nut 225, to protect the threads 223 in cleaning hole 220. FIG. 2B illustrates a similar arrangement, wherein the cleaning hole 220 is located at an angle relative to horizontal through a spool piece fluid fitting 211, located above and bolted to top cover 110.

Figure 3A:
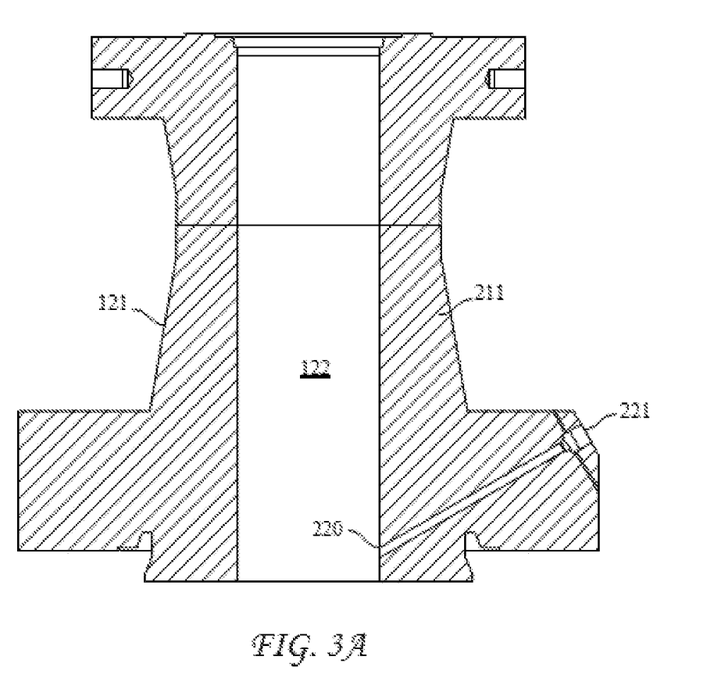
FIG. 3A is a detailed cross-sectional view of a spool piece fitting, according to FIG. 2B, illustrating the location of the cleaning hole therein.
Figure 3B:
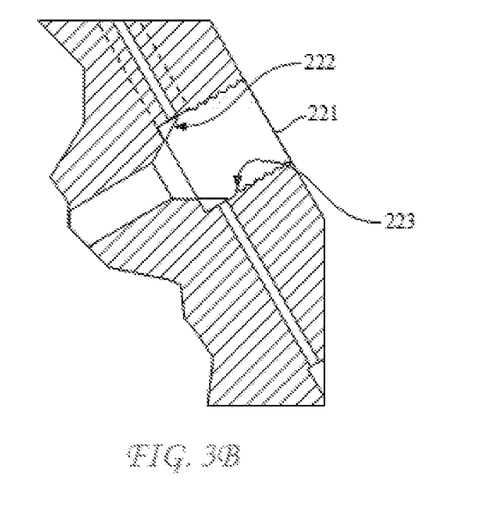
FIG. 3B is an enlarged view of the portion of the spool piece fitting highlighted in FIG. 3A.

FIG. 3A is a more detailed view of the spool piece 211, showing the location of cleaning hole 220 through and into the interior void of the spool piece 211. FIG. 3B is an enlarged view of the lower portion of spool piece 211 having the cleaning hole 220, illustrating the threaded inlet 221 of cleaning hole 220, and a frusto-conical seat 222 near the bottom of the threaded portion 223 of the inlet.

Figure 4A:
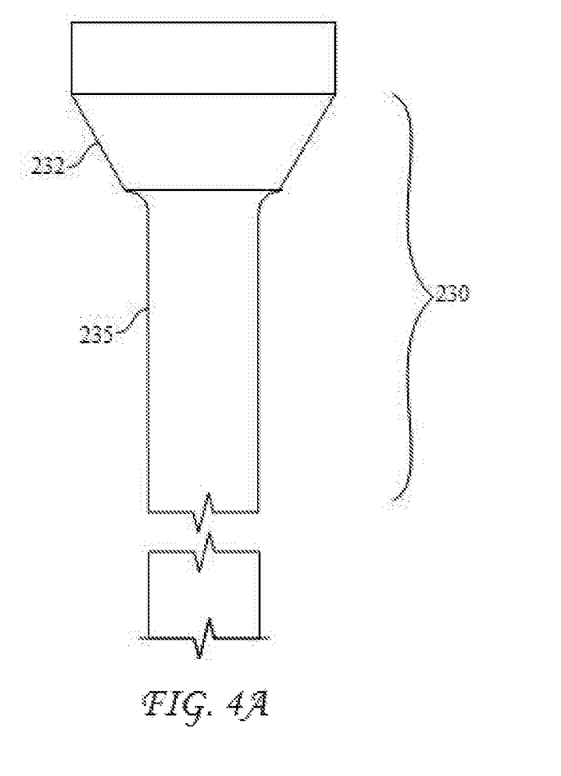
FIGS. 4A through 4D are details of the flush plug apparatuses for use in the cleaning hole.
Figure 4B:
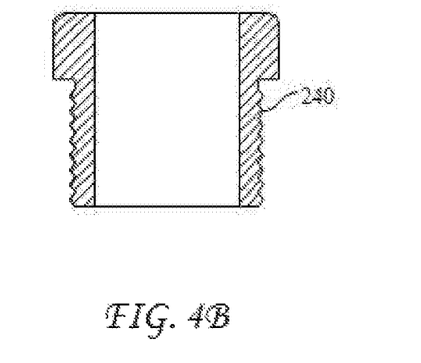
Figure 4C:
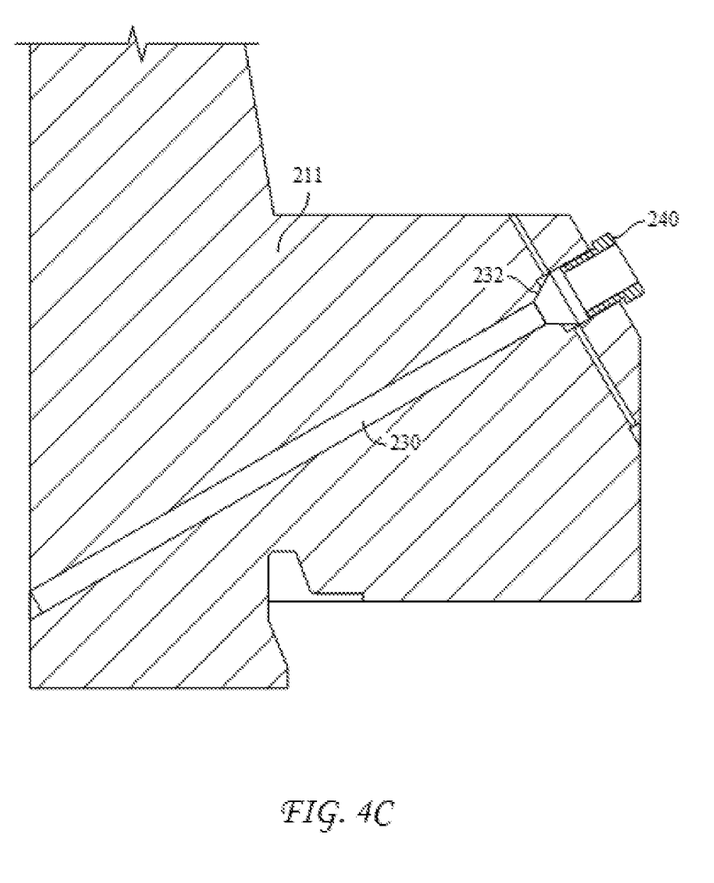

The frusto-conical seat 222 has an angular face which matches and accommodates the frusto-conical portion 232 of flush plug 230 (FIG. 4A), used to seal the HPS after cleaning. The flush plug 230 includes the frusto-conical sealing portion 232 at one end thereof, and a shaft 235 which is structured and arranged to extend through cleaning hole 220, almost to or into the interior void of the spool piece fitting 211 (FIG. 4C). When sealing of the HPS is desired, the flush plug 230 is fed into cleaning hole 220 and a gland nut 240 (FIG. 4B) is threaded into threaded portion 223 of cleaning hole 220 and into contact with a side opposite the frusto-conical sealing portion 232 of the plug, to provide an axial sealing pressure to flush plug 230, sealing the mating frusto-conical faces of seat 222 and plug 232.

Referring again to FIG. 1, the cleaning nozzle 160 is supplied with the high pressure cleaning liquid and gradually rotated and raised from the bottom of the HPS to the top, spraying the high pressure cleaning liquid 161 onto the inner wall 180 of the HPS 100 to remove accumulated polymer waste. The cleaning nozzle 160 is subsequently and gradually lowered while still being rotated, such that the pressurized cleaning liquid 161 is repeatedly directed into contact with the inner wall 180 at all locations within HPS 100. Advantageously, a second pressurized liquid cleaning nozzle 170, connected with pump P2 and its supply hose can be inserted through nozzle 140 and directed toward the bottom outlet 130, to avoid plugging of the outlet with waste polymer during the cleaning process.

Because the cleaning hole 220 is provided through the fluid fitting 120 above and adjacent to the top cover 110, neither the top cover 110 nor the fluid fitting 120 need be removed to conduct cleaning.

In another form, FIGS. 1 through 4D illustrate a system for cleaning a high pressure separator 100 includes a fluid fitting 120 structured and arranged to attach to the top cover 110 of the high pressure separator 100, the fluid fitting 120 having disposed therein a cleaning hole 220 extending from the outer wall 121 to the interior void 122 of the fluid fitting, and a removable flush plug 230 structured and arranged to seal the cleaning hole 220. The cleaning hole 220 is disposed at an angle relative to the bottom of the fluid fitting 120, as illustrated in FIG. 3A, where the fluid fitting 120 is a spool piece 211. However the fluid fitting can also be a top flange 210, as depicted in FIG. 2A.

The removable flush plug 230 includes a shaft 235 having a frusto-conical plug 232 at one end and a threaded gland nut 240 structured and arranged to thread into the cleaning hole 220 to provide axial sealing pressure to the frusto-conical plug 232 against a matching frusto-conical seat 222 in the cleaning hole.

Figure 4D:
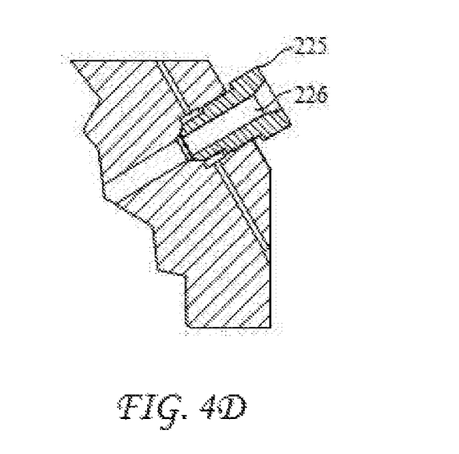

The cleaning system further includes a cleaning hose connection nut 225 having a threaded exterior structured and arranged to thread into the cleaning hole 220, and a central aperture 226 for accommodating a cord or cable, which is connectable to a rotatable high pressure cleaning nozzle 160 having a pressurized liquid supply inlet hose 165 and spray outlet for cleaning fluid 161.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" or "structured" and "arranged" mean that the element, component, or other subject matter is designed and/or intended to perform a given function. Thus, the use of the terms "adapted" and "configured" or "structured" and "arranged" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

PCT1. A process for cleaning a high pressure separator vessel in a polymerization reactor, comprising opening an outlet at a bottom of the high pressure separator vessel; removing a flush plug from a fluid fitting above and adjacent to a top cover of the high pressure separator vessel, thus exposing a cleaning hole in the fluid fitting; feeding a cord or cable through the cleaning hole into an interior of the high pressure separator vessel and down to the outlet; affixing a rotatable cleaning nozzle to the cord or cable at the outlet; supplying a pressurized liquid to the cleaning nozzle; and gradually raising and/or lowering and rotating the cleaning nozzle through the inside of the high pressure separator vessel from the bottom to a top thereof, such that the pressurized liquid is directed into contact with an inner wall of the high pressure separator vessel and removes accumulated waste material.

PCT2. The process according to paragraph PCT1, further comprising threading a cleaning hose connection nut having a central aperture into the cleaning hole to protect threads in the cleaning hole.

PCT3. The process according to paragraph PCT1 or paragraph PCT2, further comprising gradually lowering and rotating the cleaning nozzle from the top to the bottom of the interior of the high pressure separator while the pressurized liquid is supplied to the cleaning nozzle and directed into contact with the inner wall of the high pressure separator vessel.

PCT4. The process according to any one of the preceding PCT paragraphs, wherein neither the top cover of the high pressure separator vessel nor the fluid fitting above and adjacent the top cover is removed.

PCT5. The process according to any one of the preceding PCT paragraphs, wherein the fluid fitting above and adjacent to the top cover is a spool piece or a top flange.

PCT6. The process according to any one of the preceding PCT paragraphs, wherein the flush plug comprises a shaft structured and arranged to extend through the cleaning hole, a frusto-conical plug at one end of the shaft, structured and arranged to fit within and seal the cleaning hole, and a threaded gland nut structured and arranged to thread into the cleaning hole to provide axial sealing pressure to the frusto-conical plug.

PCT7. The process according to any one of the preceding PCT paragraphs, further comprising supplying pressurized liquid through a second cleaning nozzle directed at the outlet at the bottom of the high pressure separator vessel to prevent the removed waste material from plugging the outlet.

PCT8. The process according to any one of the preceding PCT paragraphs, wherein the accumulated waste material is polymer waste.

PCT9. The process according to any one of the preceding PCT paragraphs, wherein the cleaning hole is directed at an angle through the fluid fitting above the top cover.

PCT10. A cleaning system for a high pressure separator, comprising a fluid fitting structured and arranged to attach to the top cover of a high pressure separator, the fluid fitting having disposed therein a cleaning hole extending from an outer wall to an interior void of the fluid fitting, and a removable flush plug structured and arranged to seal the cleaning hole.

PCT11. The cleaning system according to paragraph PCT10, wherein the cleaning hole is disposed at an angle relative to the horizontal bottom of the fluid fitting.

PCT12. The cleaning system according to paragraph PCT10 or paragraph PCT11, wherein the fluid fitting is a spool piece or a top flange.

PCT13. The cleaning system according to any one of paragraphs PCT10 to PCT12, wherein the removable flush plug comprises a shaft having a frusto-conical plug at one end and a threaded gland nut structured and arranged to thread into the cleaning hole to provide axial sealing pressure to the frusto-conical plug.

PCT14. The cleaning system according to any one of paragraphs PCT10 to PCT13, further comprising a cleaning hose connection nut having a threaded exterior structured and arranged to thread into the cleaning hole, and a central aperture for accommodating a cord or cable.

PCT15. The cleaning system according to any one of paragraphs PCT10 to PCT14, further comprising a rotatable high pressure cleaning nozzle having a pressurized liquid supply inlet and spray outlet.

INDUSTRIAL APPLICABILITY

The systems and methods disclosed herein are applicable to the chemical industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:
1. A process for cleaning a high pressure separator vessel in a polymerization reactor without removing a top cover of the vessel, the process comprising the steps of:
   opening a bottom outlet at a bottom of the high pressure separator vessel;
   removing a flush plug from a fluid fitting above and adjacent to the top cover of the high pressure separator vessel, thus, exposing a cleaning hole in the fluid fitting;
   feeding a cord or cable through the cleaning hole downward into an interior of the high pressure separator vessel, toward the opened bottom outlet;
   inserting a rotatable cleaning nozzle into the high pressure separator vessel through the open bottom outlet;
   affixing the cleaning nozzle to a bottom end of the cord or cable at the bottom outlet;
   supplying a pressurized liquid to the cleaning nozzle; and
   rotating the cleaning nozzle while gradually raising and/or lowering the cleaning nozzle through the interior of the high pressure separator vessel to and from the bottom and a top of the high pressure separator vessel,
   such that the pressurized liquid is directed into contact with an inner wall of the high pressure separator vessel and removes accumulated waste material, thereby cleaning the high pressure separator vessel.

2. The process according to claim 1, further comprising threading a cleaning hose connection nut having a central aperture into the cleaning hole to protect threads in the cleaning hole.

3. The process according to claim 1, further comprising gradually lowering and rotating the cleaning nozzle from the top to the bottom of the interior of the high pressure separator while the pressurized liquid is supplied to the cleaning nozzle and directed into contact with the inner wall of the high pressure separator vessel.

4. The process according to claim 1, wherein the fluid fitting above and adjacent the top cover of the high pressure separator vessel is not removed.

5. The process according to claim 1, wherein the fluid fitting above and adjacent to the top cover is a spool piece or a top flange.

6. The process according to claim 1, wherein the flush plug comprises a shaft structured and arranged to extend through the cleaning hole, a frusto-conical plug at one end of the shaft, structured and arranged to fit within and seal the cleaning hole, and a threaded gland nut structured and arranged to thread into the cleaning hole to provide axial sealing pressure to the frusto-conical plug.

7. The process according to claim 1, further comprising supplying pressurized liquid through a second cleaning nozzle directed at the bottom outlet at the bottom of the high pressure separator vessel to prevent the removed waste material from plugging the outlet.

8. The process according to claim 1, wherein the accumulated waste material is polymer waste.

9. The process according to claim 1, wherein the cleaning hole is directed at an angle through the fluid fitting above the top cover.

* * * * *